United States Patent
Zaima et al.

(10) Patent No.: US 12,315,133 B2
(45) Date of Patent: May 27, 2025

(54) SUBSTRATE FOREIGN MATTER INSPECTION DEVICE AND SUBSTRATE FOREIGN MATTER INSPECTION METHOD

(71) Applicant: CKD CORPORATION, Aichi (JP)

(72) Inventors: Naohiro Zaima, Aichi (JP); Kazuyoshi Kikuchi, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 359 days.

(21) Appl. No.: 18/107,019

(22) Filed: Feb. 8, 2023

(65) Prior Publication Data

US 2023/0186458 A1    Jun. 15, 2023

Related U.S. Application Data

(63) Continuation of application No. PCT/JP2021/034795, filed on Sep. 22, 2021.

(30) Foreign Application Priority Data

Dec. 3, 2020 (JP) ................................ 2020-200874

(51) Int. Cl.
*G06K 9/00* (2022.01)
*G06T 7/00* (2017.01)
(Continued)

(52) U.S. Cl.
CPC ............ *G06T 7/0008* (2013.01); *G06T 7/001* (2013.01); *G06T 9/00* (2013.01); *G06T 15/506* (2013.01);
(Continued)

(58) Field of Classification Search
CPC ............................. G06T 7/0008; G06V 10/82
See application file for complete search history.

(56) References Cited

U.S. PATENT DOCUMENTS

2021/0334587 A1* 10/2021 Wang ..................... G06T 7/001

FOREIGN PATENT DOCUMENTS

| JP | 200617474 A | 1/2006 |
| JP | 2016519768 A | 7/2016 |

(Continued)

OTHER PUBLICATIONS

International Preliminary Report on Patentability issued in corresponding International Application No. PCT/JP2021/034795 mailed Jun. 15, 2023 (12 pages).

(Continued)

*Primary Examiner* — Molly Wilburn
*Assistant Examiner* — Aidan Keup
(74) *Attorney, Agent, or Firm* — Osha Bergman Watanabe & Burton LLP

(57) ABSTRACT

A substrate foreign matter inspection device includes: an image data obtaining device that obtains image data of a target inspection area in the printed circuit board including a printed portion of the solder paste; a storage that stores a neural network and a model, the model being generated by learning of the neural network that includes an encoding portion and a decoding portion by using, as learning data, only image data of the target inspection area that do not include any foreign matter; and a control device that obtains reconfigured image data by inputting original image data obtained by the image data obtaining device into the model, compares the original image data with the reconfigured image data, and determines whether any foreign matter is present or absent on the printed circuit board based on a result of comparison with the reconfigured image data.

4 Claims, 9 Drawing Sheets

(51) Int. Cl.
   *G06T 9/00* (2006.01)
   *G06T 15/50* (2011.01)
   *G06V 10/141* (2022.01)
   *G06V 10/74* (2022.01)
   *G06V 10/82* (2022.01)

(52) U.S. Cl.
   CPC .......... *G06V 10/141* (2022.01); *G06V 10/761* (2022.01); *G06V 10/82* (2022.01); *G06T 2207/30141* (2013.01); *G06T 2207/30152* (2013.01)

(56) References Cited

FOREIGN PATENT DOCUMENTS

KR            101911061 B1    10/2018
KR         20190017344 A   *   2/2019  ........... G06V 10/762

OTHER PUBLICATIONS

International Search Report issued in corresponding International Application No. PCT/JP2021/034795 mailed Dec. 7, 2021 (5 pages).
Written Opinion issued in corresponding International Application No. PCT/JP2021/034795 mailed Dec. 7, 2021 (4 pages).

* cited by examiner

| | |
|---|---|
| NON-DEFECTIVE SOLDER AREA IMAGES 5h1 | |
| NON-DEFECTIVE SOLDER AREA IMAGES 5h2 | |
| NON-DEFECTIVE SOLDER AREA IMAGES 5h3 | |

SUBSTRATE FOREIGN MATTER INSPECTION DEVICE AND SUBSTRATE FOREIGN MATTER INSPECTION METHOD

BACKGROUND

Technical Field

The present disclosure relates to a substrate foreign matter inspection device and a substrate foreign matter inspection method configured to perform an inspection for the presence or the absence of any foreign matter on a substrate.

Description of Related Art

In general, a substrate manufacturing line of mounting electronic components on a printed circuit board first prints solder paste on lands of a printed circuit board (solder printing process). The substrate manufacturing line then temporarily mounts electronic components on the printed circuit board by taking advantage of the viscosity of the solder paste (mounting process). The substrate manufacturing line subsequently leads this printed circuit board into a reflow furnace to heat and melt the solder paste and perform soldering (reflow process).

Such a substrate manufacturing line may be ordinarily provided with a substrate foreign matter inspection device that performs an inspection for the presence or the absence of any foreign matter in the printed circuit board, based on image data obtained by taking an image of the printed circuit board with solder paste printed thereon (as described in, for example, Patent Literature 1).

The substrate foreign matter inspection device (three-dimensional shape measurement device) described in Patent Literature 1 performs an inspection for the presence or the absence of any foreign matter by the following procedure. The procedure irradiates the printed circuit board with a plurality of color lights and takes an image of the printed circuit board, so as to obtain a two-dimensional image as two-dimensional information, and detects a foreign matter by using this two-dimensional image. The procedure also irradiates the printed circuit board with a grating patterned light and takes an image of the printed circuit board, so as to obtain a three-dimensional image as three-dimensional information, and detects a foreign matter by using this three-dimensional image. The procedure then makes a final determination of the presence or the absence of any foreign matter by combination of the result of the detection based on the two-dimensional image and the result of the detection based on the three-dimensional image.

The detection of a foreign matter using the two-dimensional image or the three-dimensional image described above is performed by comparing the two-dimensional image or the three-dimensional image with a reference image. The reference image is obtained by imaging a substrate used as a standard (master substrate) under the same conditions as the conditions for obtaining the two-dimensional image or the three-dimensional image.

In the case of using the three-dimensional image, Patent Literature 1 described above is also expected to detect a foreign matter by determining whether or not the height abruptly changes or exceeds a reference value.

PATENT LITERATURE

Patent Literature 1: JP 2016-519768A

The detection of a foreign matter by comparison of the two-dimensional image or the three-dimensional image with the reference image with regard to the master substrate, however, requires that the printed circuit board as the inspection object is identical with the master substrate. Accordingly, detection of a foreign matter is not allowed in the case where these substrate fail to have a required degree of sameness.

The process of manufacturing the printed circuit board generally includes a number of processes that require positioning or that use a mask, for example, a hole making process, a resist applying process and a solder paste printing process. Furthermore, the solder paste is obtained by kneading solder particles with a flux, so that the printed circuit board with solder paste printed thereon through the various processes described above does not have a fixed shape or a fixed appearance. Accordingly, even when a printed circuit board as an inspection object has no foreign matter, there is inevitably a difference between a two-dimensional image or a three-dimensional image of the printed circuit board and the reference image. There is accordingly a need to set relatively mild conditions with a view to preventing a false detection due to this difference. As a result, this lowers the detection capability of a foreign matter and is likely to cause a problem, for example, a failure in detection of a small foreign matter.

Furthermore, the configuration of detecting a foreign matter by determining whether the height abruptly changes or exceeds the reference value is, however, likely to allow for detection of only foreign matters having the heights of larger than a reference value with regard to solder paste. This is because a printed portion of solder paste may have a substantially vertical side face, i.e., may have an abrupt change in the height.

SUMMARY

By taking into account the circumstances described above, one or more embodiments of the present disclosure provide a substrate foreign matter inspection device or the like that enables a foreign matter to be detected more readily with a very high accuracy.

The following describes each of various aspects of the present disclosure. Functions and advantageous effects that are characteristic of each of the aspects are also described as appropriate.

Aspect 1. There is provided a substrate foreign matter inspection device that inspects whether any foreign matter is present or absent on a printed circuit board on which solder paste is printed. The substrate foreign matter inspection device comprises an image data obtaining unit (or an image data obtaining device) configured to obtain image data of a predetermined target inspection area in the printed circuit board including a printed portion of the solder paste; a storage that stores a neural network and a model, wherein the model is generated by learning of a neural network which includes an encoding portion that extracts a characteristic amount from input image data and a decoding portion that reconfigures image data from the characteristic amount, by using, as learning data, only image data of the target inspection area that do not include any foreign matter; a reconfigured image data obtaining unit (i.e., a control device) configured to obtain reconfigured image data by inputting original image data obtained by the image data obtaining unit into the model; and a comparison unit (i.e., the control device) configured to compare the original image data with the reconfigured image data. The substrate foreign matter inspection device (i.e., the control device) is configured to determine whether any foreign matter is present or absent on the printed circuit board based on a result of the comparison with the reconfigured image data. The control device obtains in advance different types of non-defective solder area images, obtains different types of virtual non-defective image data by replacing at least part of base solder area images of base image data with the different types of non-defective solder area images, and uses the different types of virtual non-defective image data as the learning data.

The "image data with regard to the target inspection area in the printed circuit board without any foreign matter" used as the "learning data" described above may be, for example, image data accumulated in previous inspections for foreign matter, virtual non-defective image data described later with regard to aspect 3, and image data of a printed circuit board without any foreign matter that is visually selected by an operator after printing of solder paste.

The "neural network" described above includes, for example, a convolutional neural network having a plurality of convolutional layers. The "learning" described above includes, for example, deep learning. The "model" (generated model) described above includes, for example, an autoencoder and a convolutional autoencoder.

Moreover, the "model" is generated by the learning using only the image data with regard to the printed circuit board without any foreign matter. Reconfigured image data generated by input of original image data with regard to a printed circuit board with a foreign matter into the model is substantially equal to the original image data after elimination of a noise portion (a portion corresponding to the foreign matter). Accordingly, in the case of a printed circuit board having a foreign matter, virtual image data with regard to the printed circuit board on the assumption of no foreign matter is generated as reconfigured image data with regard to the printed circuit board.

The configuration of above aspect 1 compares the original image data with the reconfigured image data that is reconfigured by inputting the original image data into the model, and determines the presence or the absence of any foreign matter in the printed circuit board, based on the result of the comparison. The two types of image data to be compared with each other are accordingly related to the identical printed circuit board.

The configuration of this aspect does not need to provide a master substrate for the purpose of comparison, unlike the technique of detecting a foreign matter by comparison with a reference image with regard to a master substrate. This configuration is accordingly free from the limitation of the printed circuit board as the inspection object due to the reason that the printed circuit board as the inspection object and the master substrate need to have a required degree of sameness. This configuration thus ensures the simpler inspection for any foreign matter.

The two types of image data to be compared with each other have substantially identical shapes and appearances of the printed circuit board (for example, the shapes and the positions of the solder paste). The configuration of this aspect accordingly does not need to set relatively mild conditions with a view to preventing a false detection but enables the stricter inspection conditions to be set, unlike the technique of detecting a foreign matter by comparison with the reference image. Furthermore, in the configuration of this aspect, the heights of the solder paste and changes in the heights of the solder paste do not affect the detection of a foreign matter. This configuration accordingly allows for detection of a foreign matter having a side face that changes more gently than a change in a side face of the solder paste and also allows for detection of a foreign matter that is lower than the solder paste. Moreover, the two types of image data to be compared with each other may be obtained under the same imaging conditions of the printed circuit board as the inspection object (for example, the placement position, the placement angle, and the deflection of the printed circuit board) and the same imaging conditions of the inspection device (for example, the conditions of illumination and the angle of view of a camera). The combination of these functions and advantageous effects described above enables a foreign matter to be detected with a very high accuracy.

Additionally, the configuration of this aspect uses the model to perform an inspection for any foreign matter. There is accordingly no need to store in advance printing setting information with regard to a large number of lands present on the printed circuit board and individual portions of the solder paste printed on the respective lands, for the purpose of an inspection for any foreign matter. There is also no need to refer to such printing setting information in the process of the inspection. Accordingly, this configuration enhances the efficiency of the inspection.

Aspect 2. In the substrate foreign matter inspection device described in above aspect 1, image data with regard to the target inspection area in the printed circuit board without any foreign matter may be referred to as base image data. An image with regard to an area of solder paste included in the base image data may be referred to as abase solder area image. An image with regard to an area of solder paste without any foreign matter corresponding to the base solder area image may be referred to as a non-defective solder area image. The substrate foreign matter inspection device may further comprise a learning data generation unit configured to use multiple different types of the non-defective solder area images obtained in advance and to respectively replace at least part of the base solder area images of the base image data with different types of the non-defective solder area images, so as to obtain multiple different types of virtual non-defective image data. The virtual non-defective image data obtained by the learning data generation unit may be used as the learning data.

The "base solder area image" may be, for example, an image of an expected printing location of solder paste (i.e., a land) in the printed circuit board. The "non-defective solder area image" may be, for example, an image of solder paste or an image including both a land and solder paste printed on the land. "Replacing the base solder area image with the non-defective solder area image" includes replacing part of an image of an expected printing location of solder paste (and) with an image of the solder paste as the non-defective solder area image and replacing the entirety of the image of the expected printing location of solder paste (and) with an image including both the land and the solder paste as the non-defective solder area image.

The shape of the solder paste is not fixed, so that there is a need to provide an extremely large number of image data with regard to printed circuit boards without any foreign matter (learning data) for the purpose of learning of the neural network. The technique of obtaining one image data from one printed circuit board, however, requires to provide an extremely large number of printed circuit boards in order to obtain a required number of learning data. This may lead to a significantly large cost.

The configuration of above aspect 2, on the other hand, obtains multiple different types of virtual non-defective image data by respectively replacing the base solder area images of the base image data with different types of the non-defective solder area images and performs learning of the neural network with using the obtained multiple different types of virtual non-defective image data as learning data. This configuration enables a large number of different learning data to be generated from one base image data with regard to one printed circuit board. This configuration accordingly reduces the number of printed circuit boards to be provided for learning and effectively reduces the cost.

Aspect 3. The substrate foreign matter inspection device described in above aspect 1 or above aspect 2 may further comprise an irradiation unit (or an illumination device) for three-dimensional measurement configured to irradiate the target inspection area of the printed circuit board with light for three-dimensional measurement; and an irradiation unit (or an illumination device) for two-dimensional measurement configured to irradiate the target inspection area of the printed circuit board with light for two-dimensional measurement. The image data obtaining unit may be configured to obtain three-dimensional image data that is image data with regard to the target inspection area irradiated with the light for three-dimensional measurement and to obtain two-dimensional image data that is image data with regard to the target inspection area irradiated with the light for two-dimensional measurement, and the comparison unit may be configured to compare the three-dimensional image data with reconfigured three-dimensional image data that is reconfigured using the model based on the three-dimensional image data and to compare the two-dimensional image data with reconfigured two-dimensional image data that is reconfigured using the model based on the two-dimensional image data. The substrate foreign matter inspection device may be configured to determine whether any foreign matter is present or absent on the printed circuit board based on a result of the comparison with the reconfigured three-dimensional image data and a result of the comparison with the reconfigured two-dimensional image data.

The "light for three-dimensional measurement" is, for example, patterned light having a striped light intensity distribution, and the "light for two-dimensional measurement" is, for example, uniform light.

The configuration of above aspect 3 uses both the three-dimensional image data and the two-dimensional image data to determine the presence or the absence of any foreign matter in the printed circuit board. This configuration accordingly enables a foreign matter to be detected with the higher accuracy.

Aspect 4. There is provided a substrate foreign matter inspection method of inspecting whether any foreign matter is present or absent on a printed circuit board on which solder paste is printed. The substrate foreign matter inspection method comprising: an image data obtaining process of obtaining image data of a predetermined target inspection area in the printed circuit board including a printed portion of the solder paste; a storing process of storing, in a storage, a neural network and a model, wherein the model is generated by learning of the neural network that includes an encoding portion and a decoding portion by using, as learning data, only image data of the target inspection area that do not include any foreign matter, the encoding portion extracting a characteristic amount from input image data and the decoding portion reconfiguring the input image data from the characteristic amount; a reconfigured image data obtaining process of obtaining reconfigured image data by inputting original image data obtained in the image data obtaining process into the model; a comparison process of comparing the original image data with the reconfigured image data; and a determining process of determining whether any foreign matter is present or absent on the printed circuit board based on a result of the comparison process. The method further comprises: obtaining in advance different types of non-defective solder area images, obtaining different types of virtual non-defective image data by replacing at least part of base solder area images of base image data with the different types of non-defective solder area images, and using the different types of virtual non-defective image data as the learning data.

The configuration of above aspect 4 has similar functions and advantageous effects to those of aspect 1 described above.

Aspect 5. In the substrate foreign matter inspection method described in above aspect 4, image data with regard to the target inspection area in the printed circuit board without any foreign matter may be referred to as base image data, an image with regard to an area of solder paste included in the base image data may be referred to as a base solder area image, and an image with regard to an area of solder paste without any foreign matter corresponding to the base solder area image may be referred to as a non-defective solder area image. The substrate foreign matter inspection method may further comprise a learning data generation process of using multiple different types of the non-defective solder area images obtained in advance and respectively replacing at least part of the base solder area images of the base image data with different types of the non-defective solder area images, so as to obtain multiple different types of virtual non-defective image data. The virtual non-defective image data obtained in the learning data generation process may be used as the learning data.

The configuration of above aspect 5 has similar functions and advantageous effects to those of aspect 2 described above.

Aspect 6. The substrate foreign matter inspection method described in either above aspect 4 or above aspect 5 may further comprise a three-dimensional irradiation process of irradiating the target inspection area of the printed circuit board with light for three-dimensional measurement; and a two-dimensional irradiation process of irradiating the target inspection area of the printed circuit board with light for two-dimensional measurement. The image data obtaining process may include obtaining, as three-dimensional image data, image data with regard to the target inspection area irradiated with the light for three-dimensional measurement, and obtaining, as two-dimensional image data, image data with regard to the target inspection area irradiated with the light for two-dimensional measurement. The comparison process may include comparing the three-dimensional image data with reconfigured three-dimensional image data that is reconfigured using the model based on the three-dimensional image data, and comparing the two-dimensional image data with reconfigured two-dimensional image data that is reconfigured using the model based on the two-dimensional image data. The determining process may include determining whether any foreign matter is present or absent on the printed circuit board based on results of the comparison with the reconfigured three-dimensional image data and comparison with the reconfigured two-dimensional image data.

The configuration of above aspect 6 has similar functions and advantageous effects to those of aspect 3 described above.

DETAILED DESCRIPTION OF EMBODIMENTS

Figure 1:
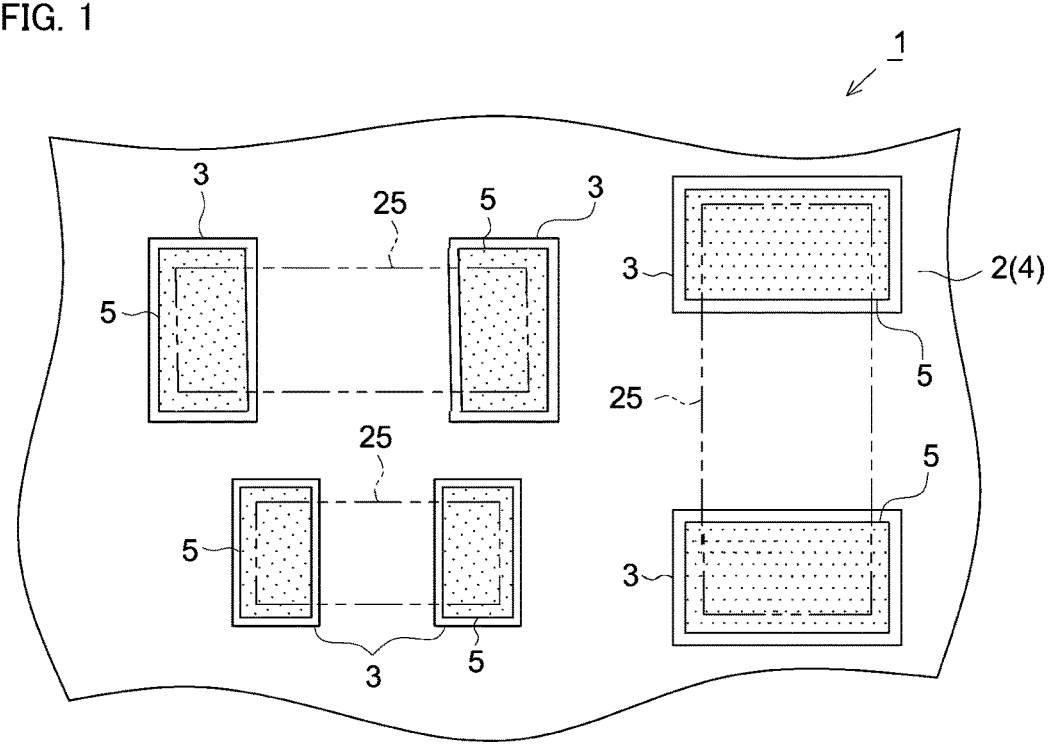
FIG. 1 is a partly enlarged plan view illustrating closeup of part of a printed circuit board.

The following describes one or more embodiments with reference to drawings. The configuration of a printed circuit board that is an object of inspection is described first. FIG. 1 is a partly enlarged plan view illustrating closeup of part of a printed circuit board.

As shown in FIG. 1, a printed circuit board 1 is configured by forming a wiring pattern (not shown) made of copper foil and a plurality of lands 3, on a surface of a base substrate 2 in a flat plate-like shape made of, for example, a glass epoxy resin. The surface of the base substrate 2 is coated with a resist film 4 in portions other than the lands 3. Solder paste 5 formed by kneading solder particles with a flux is printed on the lands 3. Dotted patterns in FIG. 1 and the like show portions representing the solder paste 5.

Figure 2:
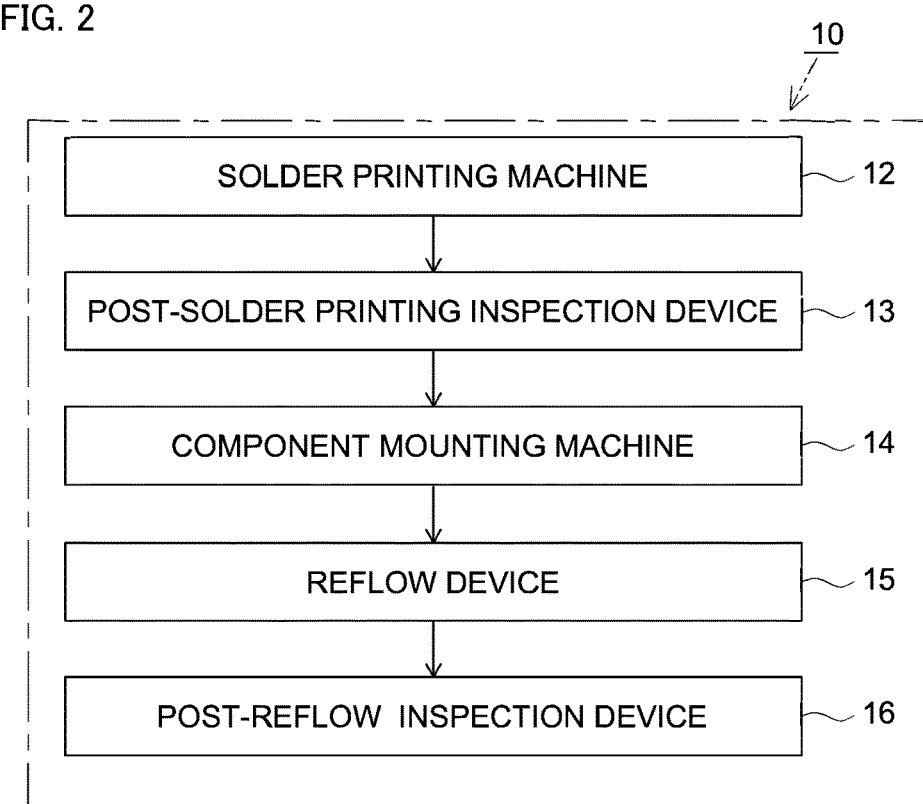
FIG. 2 is a block diagram illustrating the configuration of a manufacturing line of the printed circuit board.

A manufacturing line (a manufacturing process) of manufacturing the printed circuit board 1 is described next with reference to FIG. 2. FIG. 2 is a block diagram illustrating the configuration of a manufacturing line 10 of the printed circuit board 1. As shown in FIG. 2, in the manufacturing line 10, a solder printing machine 12, a post-solder printing inspection device 13, a component mounting machine 14, a reflow device 15, and a post-reflow inspection device 16 are placed sequentially from an upstream side thereof (from an upper side in FIG. 2). The printed circuit board 1 is set to be transferred through these devices in this sequence. According to one or more embodiments, the post-solder printing inspection device 13 configures the "substrate foreign matter inspection device".

The solder printing machine 12 performs a solder printing process of printing the solder paste 5 on each of the lands 3 of the printed circuit board 1. For example, the solder paste 5 is printed by screen printing. The screen printing causes a lower face of a screen mask to be in contact with the printed circuit board 1 and supplies the solder paste 5 on an upper face of the screen mask in this state. The screen mask includes a plurality of openings formed corresponding to the respective lands 3 of the printed circuit board 1. A predetermined squeegee is subsequently brought into contact with and moved on the upper face of the screen mask, so as to fill the openings with the solder paste 5. The printed circuit board 1 is then separated from the lower face of the screen mask, so that the solder paste 5 is printed on the respective lands 3 of the printed circuit board 1.

The post-solder printing inspection device 13 performs a post-solder printing inspection process of checking the state of the solder paste 5 printed on the lands 3 and checking for the presence of any foreign matter on the printed circuit board 1 with the solder paste 5 printed thereon. The details of the post-solder printing inspection device 13 will be described later.

The component mounting machine 14 performs a component mounting process (mounting process) of mounting an electronic component 25 (shown in FIG. 1) on the lands 3 with the solder paste 5 printed thereon. The electronic component 25 has a plurality of electrodes (not shown), each of which is temporarily fixed to a predetermined area of the solder paste 5.

The reflow device 15 performs a reflow process of heating and fusing the solder paste 5 and solder-joining (soldering) the lands 3 with the electrodes of the electronic component 16.

The post-reflow inspection device 16 performs a post-reflow inspection process of examining whether the solder-joining is performed appropriately in the reflow process. For example, the post-reflow inspection device 16 examiners whether there is a positional misalignment in the electronic component 25 by using luminance image data or the like.

Accordingly, the manufacturing line 10 performs the solder printing process, the post-solder printing inspection process, the component mounting process (the mounting process), the reflow process and the post-reflow inspection process in this sequence, while sequentially transferring the printed circuit board 1.

The manufacturing line 10 further includes conveyors or the like provided between the solder printing machine 12 and the post-solder printing inspection device 13 and between the other respective devices described above to transfer the printed circuit board, although the illustration is omitted. Furthermore, branching units are provided between the post-solder printing inspection device 13 and the component mounting machine 14 and in downstream of the post-reflow inspection device 16. The printed circuit board 1 determined as non-defective by the post-solder printing inspection device 13 and by the post-reflow inspection device 16 is guided to downstream, whereas the printed circuit board 1 determined as defective by the post-solder printing inspection device 13 or by the post-reflow inspection device 16 is discharged by the branching unit to a defective storage part.

Figure 3:
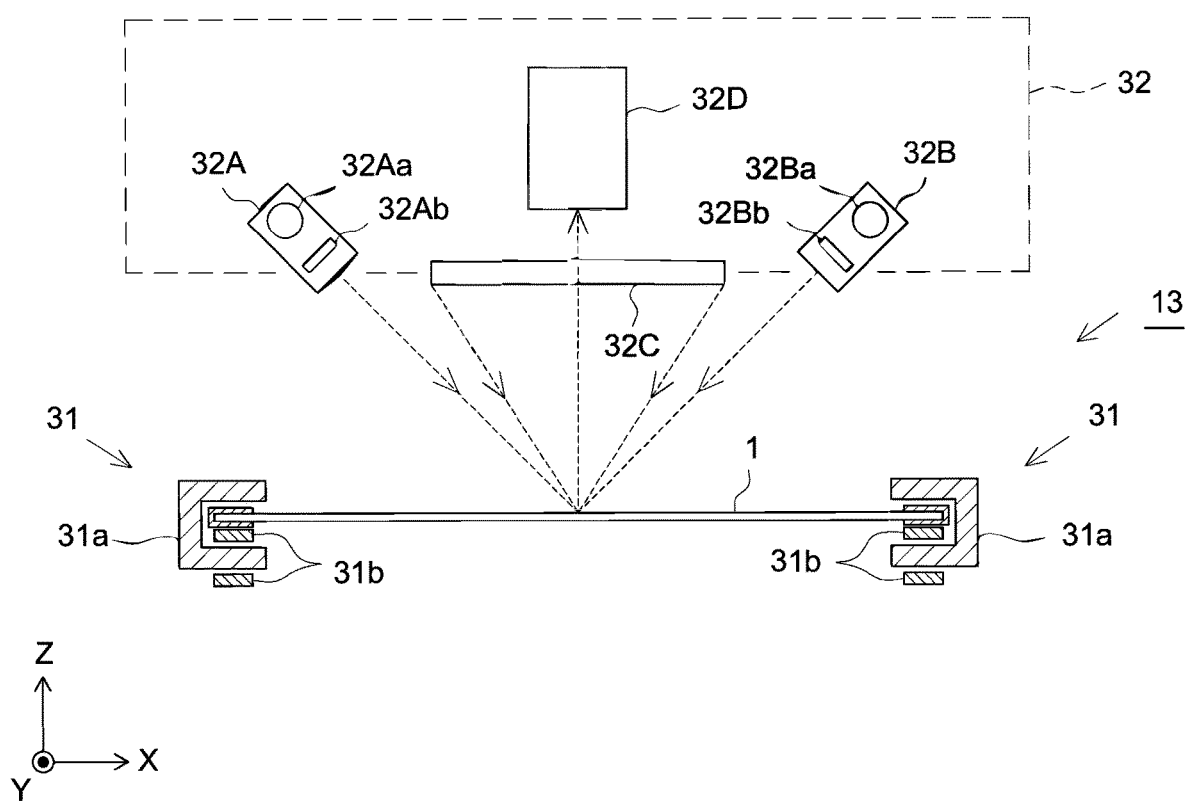
FIG. 3 is a schematic configuration diagram schematically illustrating a post-solder printing inspection device.
Figure 4:
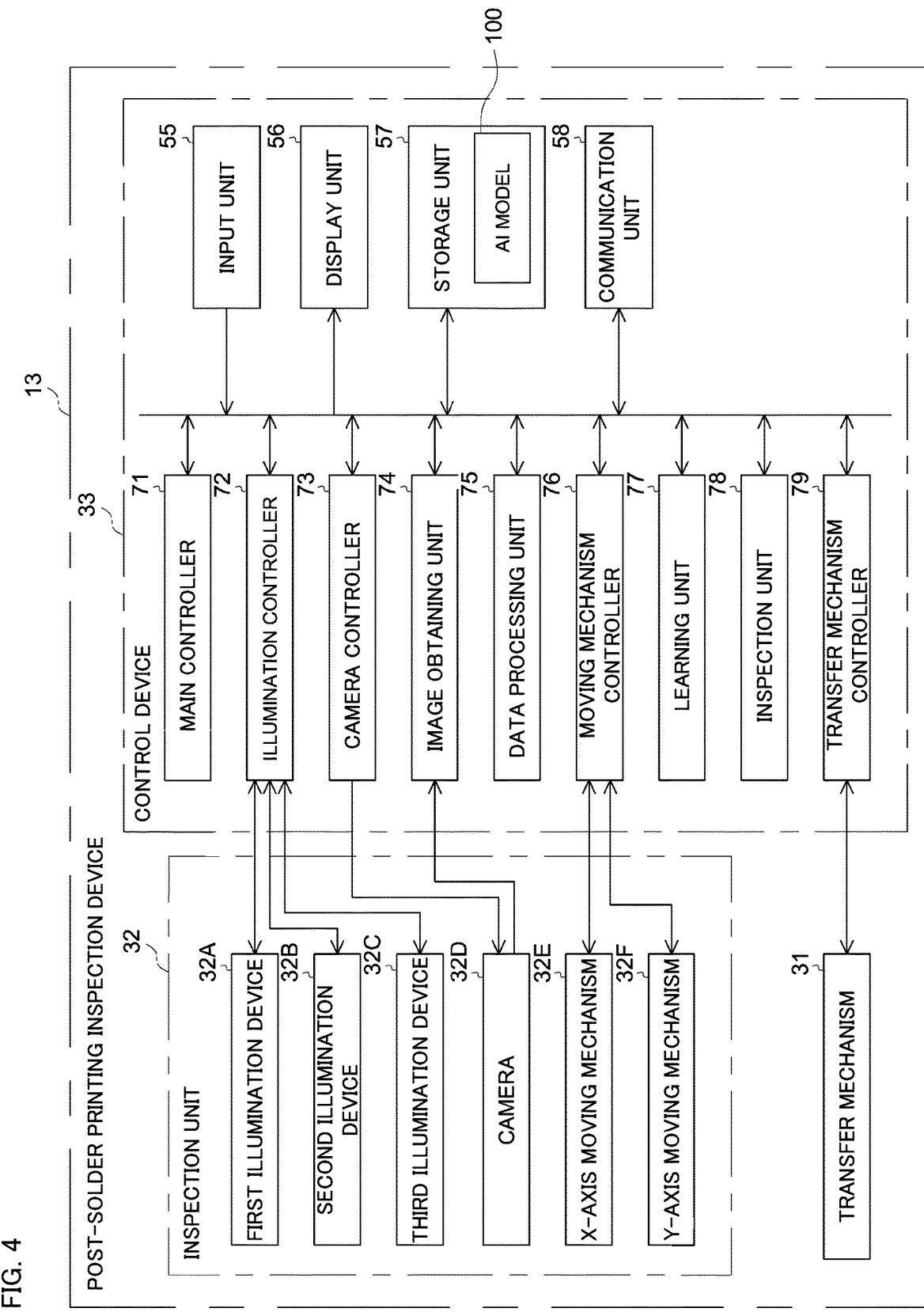
FIG. 4 is a block diagram illustrating the functional configuration of the post-solder printing inspection device.

The configuration of the post-solder printing inspection device 13 is described in detail with reference to FIG. 3 and FIG. 4. FIG. 3 is a schematic configuration diagram schematically illustrating the post-solder printing inspection device 13. FIG. 4 is a block diagram illustrating the functional configuration of the post-solder printing inspection device 13.

The post-solder printing inspection device 13 includes a transfer mechanism 31 configured to perform transfer, positioning and the like of the printed circuit board 1, an inspection unit 32 configured to perform an inspection of the printed circuit board 1, and a control device 33 (shown in FIG. 4) configured to perform drive control of the transfer mechanism 31 and the inspection unit 32, as well as various controls, image processing operations and arithmetic processing operations in the post-solder printing inspection device 13.

The transfer mechanism 31 includes a pair of transfer rails 31a arranged along a carrying in/out direction of the printed circuit board 1 and an endless conveyor belt 31b placed to be rotatable relative to the respective transfer rails 31a. The transfer mechanism 31 is also provided with a driving unit, such as a motor, configured to drive the conveyor belt 31b and a chuck mechanism configured to position the printed circuit board 1 at a predetermined position. The transfer mechanism 31 is driven and controlled by the control device 33 (by a transfer mechanism controller 79 described later).

Under the configuration described above, when the printed circuit board 1 is carried into the post-solder printing inspection device 13, respective side edges of the printed circuit board 1 in a width direction perpendicular to the carrying in/out direction of the printed circuit board 1 are inserted into the transfer rails 31a, and the printed circuit board 1 is placed on the conveyor belt 31b. The conveyor belt 31b subsequently starts operation to transfer the printed circuit board 1 to a predetermined inspection position. When the printed circuit board 1 reaches the inspection position, the conveyor belt 31 stops and the chuck mechanism described above starts operation. The operation of the chuck mechanism presses up the conveyor belt 31b and causes the respective side edges of the printed circuit board 1 to be clamped by the conveyor belt 31b and upper sides of the transfer rails 31a. This positions and fixes the printed circuit board 1 at the inspection position. When the inspection is terminated, the chuck mechanism releases the fixation, and the conveyor belt 31b starts operation. This carries out the printed circuit board 1 from the post-solder printing inspection device 13. The configuration of the transfer mechanism 31 is, however, not limited to this configuration described above, but another configuration may be employed for the transfer mechanism 31.

The inspection unit 32 is placed above the transfer rails 31a (above a transfer path of the printed circuit board 1). The inspection unit 32 includes a first illumination device 32A, a second illumination device 32B, a third illumination device 32C and a camera 32D. The inspection unit 32 also includes an X-axis moving mechanism 32E (shown in FIG. 4) configured to allow for motion in an X-axis direction (left-right direction in FIG. 3) and a Y-axis moving mechanism 32F (shown in FIG. 4) configured to allow for motion in a Y-axis direction (front-back direction in FIG. 3). The inspection unit 32 is driven and controlled by the control device 33 (by a moving mechanism controller 76 described later). According to one or more embodiments, the first illumination device 32A and the second illumination device 32B configure the "irradiation unit for three-dimensional measurement"; the third illumination device 32C configures the "irradiation unit for two-dimensional measurement"; and the camera 32D configures the "image data obtaining unit" or "image data obtaining device".

The first illumination device 32A and the second illumination device 32B respectively irradiate a predetermined inspection target area of the printed circuit board 1 obliquely downward with predetermined lights for three-dimensional measurement (patterned lights having striped light intensity distributions) in a process of performing three-dimensional measurement of the printed circuit board 1.

More specifically, the first illustration device 32A includes a first light source 32Aa configured to emit predetermined light and a first liquid crystal shutter 32Ab configured to form a first grating that serves to convert the light emitted from the first light source 32Aa into a first patterned light having a striped light intensity distribution, and is driven and controlled by the control device 33 (by an illumination controller 72 described later).

The second illumination device 32B includes a second light source 32Ba configured to emit predetermined light and a second liquid crystal shutter 32Bb configured to form a second grating that serves to convert the light emitted from the second light source 32Ba into a second patterned light having a striped light intensity distribution, and is driven and controlled by the control device 33 (by the illumination controller 72 described later).

Under the configuration described above, the lights emitted from the respective light sources 32Aa and 32Ba are respectively led to condenser lenses (not shown) to become parallel lights and are then led to projection lenses (not shown) via the liquid crystal shutters 32Ab and 32Bb to be projected as the patterned lights on the printed circuit board 1. According to one or more embodiments, the liquid crystal shutters 32Ab and 32Bb are subjected to switching control to shift the phases of the respective patterned lights by every ¼ pitches.

Using the liquid crystal shutters 32Ab and 32Bb as the gratings allows for radiation of the patterned lights approximate to an ideal sinusoidal wave. This configuration improves the measurement resolution of three-dimensional measurement. This configuration also allows for electrical phase shift control of the patterned lights and thereby achieves size reduction of the apparatus.

The third illumination device 32C is configured to irradiate the predetermined target inspection area of the printed circuit board 1 with predetermined light for two-dimensional measurement (for example, uniform light) in a process of performing two-dimensional measurement of the printed circuit board 1.

More specifically, the third illumination device 32C includes a ring light configured to emit blue light, a ring light configured to emit green light, and a ring light configured to emit red light. The third illumination device 32C has a configuration similar to a configuration of known art and is accordingly not described in detail herein.

The camera 32D is configured to take an image of the predetermined target inspection area of the printed circuit board 1 from directly above. The camera 32D includes an imaging element, such as a CCD (Charge Coupled Device)-type image sensor or a CMOS (Complementary Metal Oxide Semiconductor)-type image sensor and an optical system (for example, a lens unit and a diaphragm) configured to focus an image of the printed circuit board 1 on the imaging element, and is arranged such that an optical axis of the camera 32D is along a vertical direction (Z-axis direction). The imaging element is, however, not limited to these examples, but another imaging element may be employed.

The camera 32D is driven and controlled by the control device 33 (by a camera controller 73 described later). More specifically, the control device 33 performs an imaging process by the camera 32D, in synchronism with an irradiation process by the respective illumination devices 32A, 32B and 32C. This configuration enables an image of a light that is emitted from one of the illumination devices 32A, 32B and 32C and that is reflected by the printed circuit board 1, to be taken by the camera 32D. As a result, this configuration obtains image data of the target inspection area of the printed circuit board 1 including printed portions of the solder paste 5. The "target inspection area" in the printed circuit board 1 denotes one area out of a plurality of areas set in advance in the printed circuit board 1 with the size of an imaging field of view (imaging range) of the camera 32D as one unit.

The camera 32D according to one or more embodiments is configured by a color camera. This configuration enables an image of the lights of the respective colors, which are simultaneously emitted from the respective color ring lights of the third illumination device 32C and that are reflected by the printed circuit board 1, to be taken at a time.

Image data taken and generated by the camera 32D are converted into digital signals inside of the camera 32D and are transferred in the form of digital signals to the control device 33 (to an image obtaining unit 74 described later) to be stored therein. The control device 33 performs various image processing operations and arithmetic processing operations and the like described later, based on the image data.

The control device 33 is configured by a computer including, for example, a CPU (Central Processing Unit) that performs predetermined arithmetic processing operations, a ROM (Read Only Memory) that stores a variety of programs, fixed value data and the like, a RAM (Random Access Memory) that temporarily stores various data in the course of performing the various arithmetic processing operations, and peripheral circuits thereof.

As the CPU operates according to the variety of programs, the control device 33 serves as various functional parts including a main controller 71, the illumination controller 72, the camera controller 73, the image obtaining unit 74, a data processing unit 75, the moving mechanism controller 76, a learning unit 77, an inspection unit 78 and the transfer mechanism controller 79 described later.

The various functional parts described above are implemented by cooperation of various hardware components including the CPU, the ROM and the RAM described above. There is no need to distinctively differentiate the functions implemented by the software from the functions implemented by the hardware. Part or the entirety of these functions may be implemented by hardware circuits such as ICs.

The control device 33 is further provided with, for example, an input unit 55 configured by a keyboard and a mouse, a touch panel or the like, a display unit 56 configured by a liquid crystal display or the like and provided with a display screen, a storage unit 57 configured to store, for example, various data, programs, operation results and inspection results, and a communication unit 58 configured to send and receive various data to and from outside.

The following describes the above various functional parts constituting the control device 33 in detail.

The main controller 71 is a functional part serving to control the post-solder printing inspection device 13 as a whole and is configured to send and receive various signals to and from the other functional parts, such as the illumination controller 72 and the camera controller 73.

The illumination controller 72 is a functional part serving to drive and control the illumination devices 32A, 32B and 32C and is configured to perform, for example, switching control of irradiation light, in response to a command signal from the main controller 71.

The camera controller 73 is a functional part serving to drive and control the camera 32D and is configured to control, for example, an imaging timing, in response to a command signal from the main controller 71.

The image obtaining unit 74 is a functional part serving to take in image data taken and obtained by the camera 32D.

The data processing unit 75 is a functional part serving to process image data taken in by the image obtaining unit 74 by a predetermined image processing operation and to perform a two-dimensional measurement process and a three-dimensional measurement process by using the image data.

The moving mechanism controller 76 is a functional part serving to drive and control the X-axis moving mechanism 32E and the Y-axis moving mechanism 32F and is configured to control the position of the inspection unit 32, in response to a command signal from the main controller 71. The moving mechanism controller 76 drives and controls the X-axis moving mechanism 32E and the Y-axis moving mechanism 32F to move the inspection unit 32 to a position above any arbitrary target inspection area of the printed circuit board 1 positioned and fixed at the inspection position. The entire area of the printed circuit board 1 is checked by sequentially moving the inspection unit 32 to a plurality of target inspection areas set in the printed circuit board 1 and performing an inspection with regard to the respective target inspection areas.

The learning unit 77 is a functional part serving to perform learning of a deep neural network 90 (hereinafter simply referred to as "neural network 90": shown in FIG. 5) by using learning data and to build an AI (Artificial Intelligence) model 100.

The AI model 100 according to one or more embodiments is a generated model built by deep learning of the neural network 90 with using only image data with regard to target inspection areas of a non-defective printed circuit board 1 without any foreign matter as learning data, and has the structure of an autoencoder, as described later.

Figure 5:
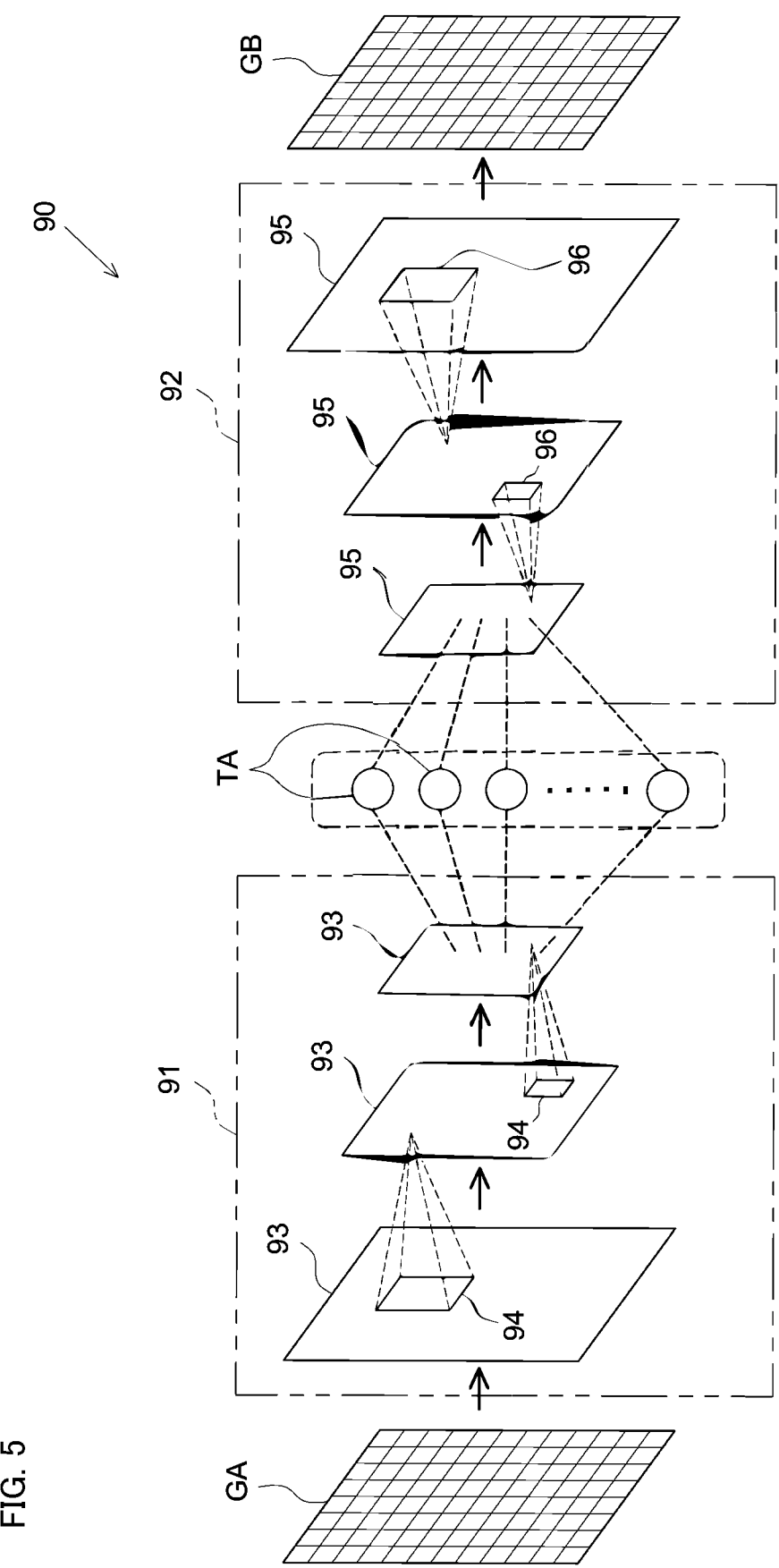
FIG. 5 is a schematic diagram illustrating the structure of a neural network.

The following describes the structure of the neural network 90 with reference to FIG. 5. FIG. 5 is a schematic diagram conceptually illustrating the structure of the neural network 90. As shown in FIG. 5, the neural network 90 has the structure of a convolutional autoencoder (CAE) that includes an encoder unit 91 serving as an encoding portion to extract a characteristic amount (latent variable) TA from input image data GA and a decoder unit 92 serving as a decoding portion to restructure image data GB from the characteristic amount TA.

The structure of the convolutional autoencoder is known in the art and is not described in detail herein. The encoder unit 91 has a plurality of convolution layers 93. Each convolution layer 93 is configured to output a result of a convolution operation of input data using a plurality of filters (kernels) 94, as input data of a next layer. Similarly, the decoder unit 92 has a plurality of deconvolution layers 95. Each deconvolution layer 95 is configured to output a result of a deconvolution operation of input data using a plurality of filters (kernels) 96, as input data of a next layer. A weight (parameter) of each of the filters 94 and 96 is updated in a learning process described later.

The inspection unit 78 is a functional part serving to perform an inspection of the printed circuit board 1 with the solder paste 5 printed thereon. For example, according to one or more embodiments, the inspection unit 78 performs an inspection to determine whether there is any foreign matter adhering to the printed circuit board 1 and whether the solder paste 5 is printed appropriately.

The transfer mechanism controller 79 is a functional part serving to drive and control the transfer mechanism 31 and is configured to control the position of the printed circuit board 1, in response to a command signal from the main controller 71.

The storage unit 57 is configured by, for example, an HDD (Hard Disk Drive) or an SSD (Solid State Drive) and has, for example, a predetermined storage area provided to store the AI model 100 (the neural network 90 and learnt information obtained by learning of the neural network 90).

The communication unit 58 includes a wireless communication interface or the like in conformity with a communications standard such as a wired LAN (Local Area Network) or a wireless LAN and is configured to send and receive various data to and from outside. For example, results of an inspection performed by the inspection unit 78 are output via the communication unit 58 to outside, and results of an inspection performed by the post-reflow inspection device 16 are input via the communication unit 58.

Figure 6:
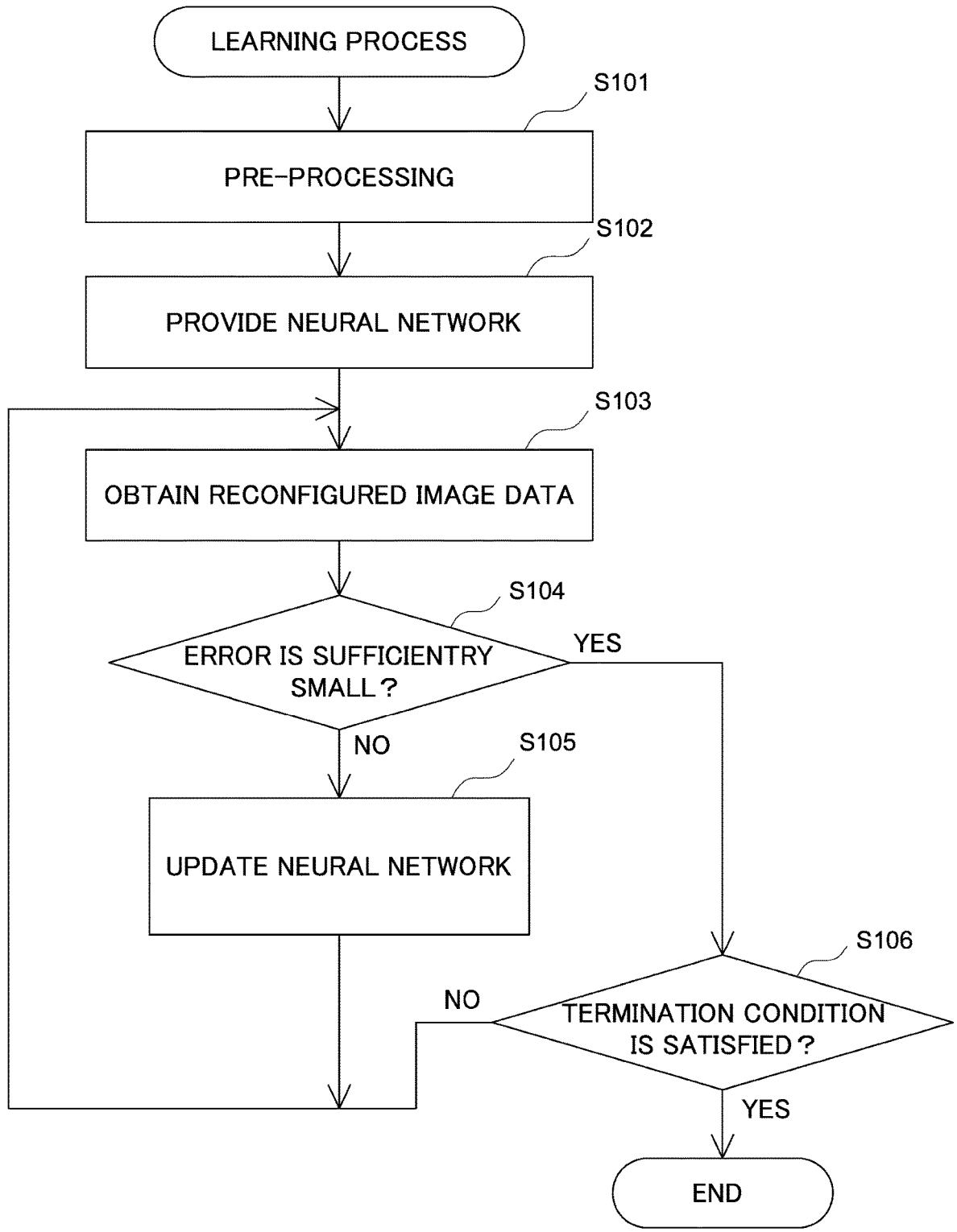
FIG. 6 is a flowchart showing a flow of a learning process of the neural network.

The following describes a learning process of the neural network 90 performed by the post-solder printing inspection device 13 with reference to the flowchart of FIG. 6.

When the learning process is started by executing a predetermined learning program, the main controller 71 first performs pre-processing for learning of the neural network 90 at step S101.

In this pre-processing, the main controller 71 first obtains inspection information of a large number of printed circuit boards 1 stored in the post-reflow inspection device 16 via the communication unit 58. The main controller 71 subsequently obtains image data with regard to a non-defective printed circuit board 1 without any foreign matter, which has passed a post-reflow inspection, from the storage unit 57, based on the inspection information. This image data is used as learning data for learning of the neural network 90. This image data includes three-dimensional image data that is image data obtained by imaging the printed circuit board 1 with the camera 32D in the state that the printed circuit board 1 is irradiated with the patterned light emitted from the first illumination device 32A or from the second illumination device 32B, and two-dimensional image data that is image data obtained by imaging the printed circuit board 1 with the camera 32D in the state that the printed circuit board 1 is irradiated with the uniform light emitted from the third illumination device 32C. This process is repeated until a required number of image data are obtained as learning data.

In one or more embodiments, the printed circuit board 1 as the subject for obtaining the inspection information from the post-reflow inspection device 16 has an identical configuration with the configuration of the printed circuit board 1 as an inspection object. The printed circuit board 1 is, however, not required to have, for example, an identical thickness, an identical material, an identical size, or an identical arrangement layout. Learning based on various different types of learning data would enhance the general versatility.

When the required number of image data for learning are obtained at step S101, the learning unit 77 provides an unlearnt neural network 90, in response to a command from the main controller 71 at step S102. For example, the learning unit 77 reads out a neural network 90 stored in advance in the storage unit 57 or the like. In another example, the learning unit 77 builds a neural network, based on network configuration information (for example, the number of layers of a neural network and the number of nodes in each layer) stored in the storage unit 57 or the like. According to one or more embodiments, the learning unit 77 separately builds a network for learning by using two-dimensional image data (two-dimensional neural network) and a network for learning by using three-dimensional image data (three-dimensional neural network), as the neural network 90.

At step S103, the learning unit 77 obtains reconfigured image data. More specifically, in response to a command from the main controller 71, the learning unit 77 gives image data obtained at step S102, as input data, to an input layer of the neural network 102 and obtains reconfigured image data that is output, as a result of the input, from an output layer of the neural network 90. More in detail, with regard to learning of the two-dimensional neural network, the learning unit 77 gives two-dimensional image data obtained at step S102, as input data, to the input layer of the neural network 90 (the two-dimensional neural network) and obtains reconfigured two-dimensional image data that is output, as a result of the input, from the output layer of the neural network 90. With regard to learning of the three-dimensional neural network, the learning unit 77 gives three-dimensional image data obtained at step S102, as input data, to the input layer of the neural network 90 (the three-dimensional neural network) and obtains reconfigured three-dimensional image data that is output, as a result of the input, from the output layer of the neural network 90.

At subsequent step S104, the learning unit 77 compares the input image data with the reconfigured image data output from the neural network 90 and determines whether or not an error is sufficiently small (whether or not an error is equal to or smaller than a predetermined reference value). For example, in the case of learning of the two-dimensional neural network, the two-dimensional image data is compared with the reconfigured two-dimensional image data.

When the error is sufficiently small, the learning unit 77 determines whether a termination condition of learning is satisfied at step S106. It is determined that the termination condition is satisfied, for example, when an affirmative determination at step S104 is continually made a predetermined number of times without proceeding to the processing of step S105 described later or when learning using all the provided image data is repeated a predetermined number of times. When the termination condition is satisfied, the learning unit 77 stores the neural network 90 and learning information thereof (for example, updated parameters described later) as the AI model 100 into the storage unit 57 and terminates the learning process. According to one or more embodiments, a model (two-dimensional AI model) corresponding to the two-dimensional image data and a model (three-dimensional AI model) corresponding to the three-dimensional image data are eventually stored as the AI model.

When the termination condition is not satisfied at step S106, on the other hand, the learning unit 77 returns to step S103 to perform learning of the neural network 90 again.

When the error is not sufficiently small at step S104, the learning unit 77 performs a network updating process (learning of the neural network 90) at step S105 and returns to step S103 to repeat the above series of processing.

Specifically, the network updating process at step S105 uses a known learning algorithm, for example, a backpropagation algorithm, and updates weights (parameters) of the respective filters 94 and 96 described above in the neural network 90 to more appropriate values, such as to minimize a loss function indicating a difference between the image data for learning and the reconfigured image data. For example, a BCE (Binary Cross-entropy) may be used as the loss function.

Repeating the processing of steps S103 to S105 a number of times minimizes the error between the image data for learning and the reconfigured image data and enables the neural network 90 to output the reconfigured image data of the higher accuracy.

In the case of input of image data with regard to a printed circuit board 1 without any foreign matter, the eventually obtained AI model 100 generates reconfigured image data that is substantially identical with the input image data. In the case of input of image data with regard to a printed circuit board 1 with any foreign matter, on the other hand, the AI model 100 generates reconfigured image data that is substantially identical with the image data with elimination of a noise portion (a portion corresponding to the foreign matter). In the case where the printed circuit board 1 has any foreign matter, virtual image data with regard to the printed circuit board 1 assumed to have no foreign matter are accordingly generated, as reconfigured image data with regard to the printed circuit board 1 with the foreign matter.

Figure 7:
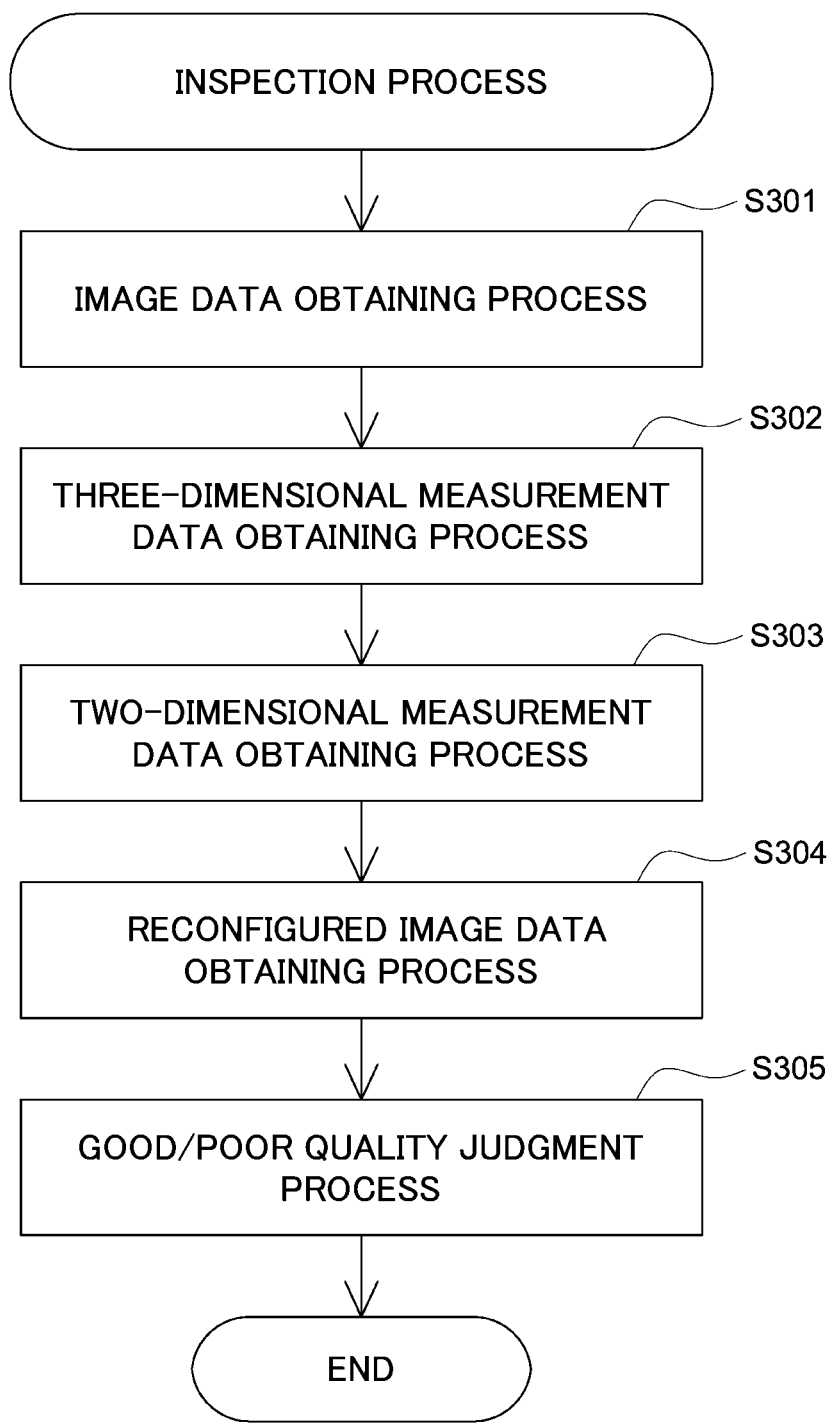
FIG. 7 is a flowchart showing a flow of an inspection process.

The following describes an inspection process performed by the post-solder printing inspection device 13 with reference to the flowchart of FIG. 7. The inspection process shown in FIG. 7 is a process performed for each target inspection area of the printed circuit board 1.

When the printed circuit board 1 is carried into the post-solder printing inspection device 13 and is positioned at a predetermined inspection position, the inspection process is started by executing a predetermined inspection program.

On the start of the inspection process, an image data obtaining process is performed first at step S301. The image data obtaining process includes a process of obtaining three-dimensional image data and a process of obtaining two-dimensional image data.

In the image data obtaining process, the process of obtaining the three-dimensional image data is performed first. In an inspection with regard to each target inspection area of the printed circuit board 1, a procedure of one or more embodiments performs four imaging processes under the first patterned light of different phases with changing the phase of the first patterned light emitted from the first illumination device 32A and subsequently performs four imaging processes under the second patterned light of different phases with changing the phase of the second patterned light emitted from the second illumination device 32B, so as to obtain a total of eight three-dimensional image data. This procedure is described in detail below.

As described above, when the printed circuit board 1 carried into the post-solder printing inspection device 13 is positioned and fixed at the predetermined inspection position, in response to a command from the main controller 71, the moving mechanism controller 76 first drives and controls the X-axis moving mechanism 32E and the Y-axis moving mechanism 32F to move the inspection unit 32 and adjusts an imaging field of view (imaging range) of the camera 32D to a predetermined target inspection area of the printed circuit board 1.

In the meanwhile, the illumination controller 72 performs switching control of the liquid crystal shutters 32Ab and 32Bb of the respective illumination devices 32A and 32B to set the positions of the first grating and the second grating formed by the respective liquid crystal shutters 32Ab and 32Bb to predetermined reference positions.

On completion of the switching setting of the first grating and the second grating, the illumination controller 72 turns on the first light source 32Aa of the first illumination device 32A to emit the first patterned light, and the camera controller 73 drives and controls the camera 32D to perform a first imaging process under the first patterned light. Image data generated by the imaging process are occasionally taken into the image obtaining unit 74 (the same applies hereinafter). The image obtaining unit 74 accordingly obtains three-dimensional image data of a target inspection area including a plurality of lands 3 (portions of the solder paste 5).

Simultaneously with termination of the first imaging process under the first patterned light, the illumination controller 72 turns off the first light source 32Aa of the first illumination device 32A and performs a switching process of the first liquid crystal shutter 32Ab. More specifically, the illumination controller 72 switches the setting of the position of the first grating formed by the first liquid crystal shutter 32Ab from the reference position to a second position having the phase of the first patterned light shifted by ¼ pitches (90 degrees).

On completion of the switching setting of the first grating, the illumination controller 72 turns on the light source 32Aa of the first illumination device 32A to emit the first patterned light, and the camera controller 73 drives and controls the camera 32D to perform a second imaging process under the first patterned light. This series of processing is repeated, so as to obtain four three-dimensional image data under the first patterned light of the different phases by shifting the phase by every 90 degrees.

The illumination controller 72 subsequently turns on the second light source 32Ba of the second illumination device 32B to emit the second patterned light, and the camera controller 73 drives and controls the camera 32D to perform a first imaging process under the second patterned light.

Simultaneously with termination of the first imaging process under the second patterned light, the illumination controller 72 turns off the second light source 32Ba of the second illumination device 32B and performs a switching process of the second liquid crystal shutter 32Bb. More specifically, the illumination controller 72 switches the setting of the position of the second grating formed by the second liquid crystal shutter 32Bb from the reference position to a second position having the phase of the second patterned light shifted by ¼ pitches (90 degrees).

On completion of the switching setting of the second grating, the illumination controller 72 turns on the light source 32Ba of the second illumination device 32B to emit the second patterned light, and the camera controller 73 drives and controls the camera 32D to perform a second imaging process under the second patterned light. This series of processing is repeated, so as to obtain four three-dimensional image data under the second patterned light of the different phases by shifting the phase by every 90 degrees. According to one or more embodiments, the process of irradiating the target inspection area of the printed circuit board 1 with the patterned light emitted from the first illumination device 32A or from the second illumination device 32B in the process of obtaining the three-dimensional image data corresponds to the "irradiation process for three-dimensional measurement".

The process of obtaining the two-dimensional image data is performed subsequently. According to one or more embodiments, in an inspection with regard to each target inspection area of the printed circuit board 1, in response to a command from the main controller 71, the illumination controller 72 turns on the third illumination device 32C to irradiate a predetermined target inspection area with the uniform light, and the camera controller 73 drives and controls the camera 32D to perform an imaging process under the uniform light. This takes an image of the predetermined target inspection area on the printed circuit board 1 and obtains two-dimensional image data with regard to the target inspection area. According to one or more embodiments, the process of irradiating the target inspection area of the printed circuit board 1 with the uniform light emitted from the third illumination device 32C in the process of obtaining two-dimensional image data corresponds to the "irradiation process for two-dimensional measurement". The three-dimensional image data and the two-dimensional image data obtained are respectively numbered and are stored into the storage unit 57.

At subsequent step S302, a three-dimensional measurement data obtaining process is performed. More specifically, in response to a command from the main controller 71, the data processing unit 75 performs three-dimensional shape measurement of the predetermined target inspection area including the plurality of portions of the solder paste 5 by a known phase shift method, based on the plurality of the three-dimensional image data obtained under the respective patterned lights at step S301 as described above, and stores the results of the measurement (three-dimensional measurement data) into the storage unit 57. The configuration of one or more embodiments performs the three-dimensional shape measurement with radiation of the patterned lights from two different directions and accordingly prevents the occurrence of a shadow portion that is not irradiated with any patterned light.

At subsequent step S303, a two-dimensional measurement data obtaining process is performed. More specifically, in response to a command from the main controller 71, the data processing unit 75 performs two-dimensional shape measurement of the predetermined target inspection area including the plurality of portions of the solder paste 5, based on the two-dimensional image data obtained under the uniform light at step S302 as described above, and stores the results of the measurement (two-dimensional measurement data) into the storage unit 57.

At step S304, a reconfigured image data obtaining process is performed. More specifically, in response to a command from the main controller 71, the inspection unit 78 inputs three-dimensional image data (original image data) of a predetermined number (for example, No. 001) obtained at step S301, into an input layer of the AI model 100 (three-dimensional AI model) corresponding to the three-dimensional image data. The inspection unit 78 then obtains image data reconfigured by the AI model 100 and output from an output layer thereof, as reconfigured three-dimensional image data of the predetermined number (for example, No. 001). The reconfigured three-dimensional image data thus obtained are stored in relation to the three-dimensional image data (original image data) of the same number.

The two-dimensional image data obtained at step S301 are subjected to a similar series of processing to the processing described above. More specifically, the inspection unit 78 inputs two-dimensional image data (original image data) of a predetermined number obtained at step S301, into an input layer of the AI model 100 (two-dimensional AI model) corresponding to the two-dimensional image data. The inspection unit 78 then obtains image data reconfigured by the AI model 100 and output from an output layer thereof, as reconfigured two-dimensional image data of the predetermined number. The reconfigured two-dimensional image data thus obtained are stored in relation to the two-dimensional image data (original image data) of the same number. According to one or more embodiments, the inspection unit 78 that performs the process of obtaining the reconfigured three-dimensional image data and that performs the process of obtaining the reconfigured two-dimensional image data configures the "reconfigured image data obtaining unit".

Figure 8:
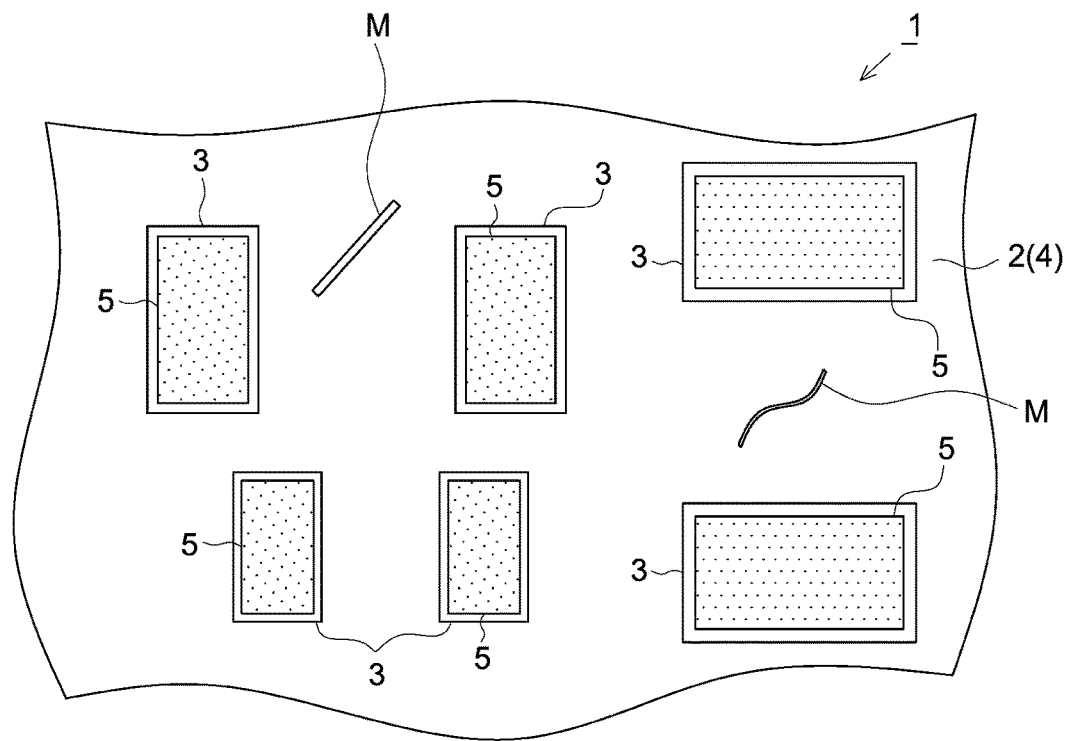
FIG. 8 is a diagram illustrating one example of image data with regard to a printed circuit board having foreign matters.
Figure 9:
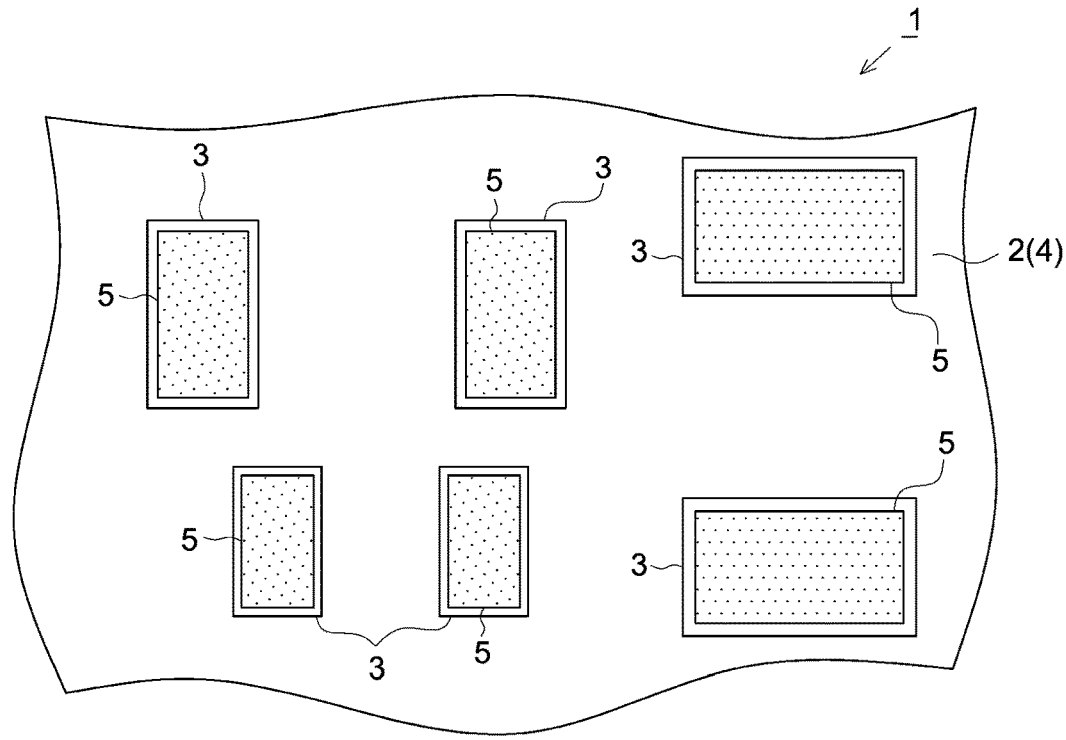
FIG. 9 is a diagram illustrating one example of image data reconfigured by an AI mode.

The learning as described above enables the AI model 100 to output image data without any foreign matter similar to FIG. 9, as reconfigured image data even in the case of input of image data with regard to the printed circuit board 1 having a foreign matter M as shown in FIG. 8, as well as in the case of input of image data with regard to the printed circuit board 1 without any foreign matter.

At step S305, a good/poor quality judgment process is performed, based on the obtained image data. A procedure of one or more embodiments includes a three-dimensional good/poor quality judgment process of performing good/poor quality judgment with regard to predetermined three-dimensional information relating to the solder paste 5, a two-dimensional good/poor quality judgment process of performing good/poor quality judgment with regard to predetermined two-dimensional information relating to the solder paste 5, and a foreign matter presence/absence determination process of performing good/poor quality judgment with regard to the presence or absence of any foreign matter on the printed circuit board 1.

The three-dimensional good/poor quality judgment process performs good/poor quality judgement with regard to predetermined three-dimensional information relating to the solder paste 5, based on the three-dimensional measurement data obtained by the three-dimensional measurement data obtaining process at step S302 as described above.

More specifically, in response to a command from the main controller 71, the inspection unit 78 calculates a "volume" and a "height" of the solder paste 5, based on the three-dimensional measurement data obtained at step S302 as described above. The inspection unit 78 subsequently compares the calculated "volume" and "height" of the solder paste 5 with respective reference data stored in advance in the storage unit 57 and determines whether the "volume" and the "height" of the solder paste 5 are respectively within reference ranges. The good/poor quality judgment process of these inspection items (three-dimensional information) may be performed by a known method and is thus not described in detail herein.

The two-dimensional good/poor quality judgment process performs good/poor quality judgement with regard to predetermined two-dimensional information relating to the solder paste 5, based on the two-dimensional measurement data obtained by the two-dimensional measurement data obtaining process at step S303 as described above.

More specifically, in response to a command from the main controller 71, the inspection unit 78 calculates an "area" and a "positional misalignment amount" of the solder paste 5, based on the two-dimensional measurement data obtained at step S303 as described above, and extracts a "two-dimensional shape" of the solder paste 5 and a "solder bridge" spanned between a plurality of the lands 3.

The inspection unit 78 subsequently compares the calculated "area" and "positional misalignment" of the solder paste 5 and the extracted "two-dimensional shape" and "solder bridge" with respective reference data stored in advance in the storage unit 57 and determines whether these items are respectively within reference ranges. The good/poor quality judgment process of these inspection items (two-dimensional information) may be performed by a known method and is thus not described in detail herein.

In the foreign matter presence/absence determination process, in response to a command from the main controller 71, the inspection unit 78 compares the three-dimensional image data (original image data) and the reconfigured three-dimensional image data of each identical number obtained at step S304 with each other, so as to calculate a difference between these two types of image data. For example, the inspection unit 78 compares dots at identical coordinates in the respective image data and calculates an area of a mass of dots (the number of dots) having luminance differences of not smaller than a predetermined value.

The inspection unit 78 also compares the two-dimensional image data (original image data) and the reconfigured two-dimensional image data of each identical number obtained at step S304 with each other, so as to calculate a difference between these two types of image data. According to one or more embodiments, the inspection unit 78 that compares the original image data with the reconfigured image data configures the "comparison unit". The process of comparing the original image data with the reconfigured image data corresponds to the "comparison process".

The inspection unit 78 subsequently determines the presence or the absence of any foreign matter on the printed circuit board 1, based on the results of the comparison with regard to the three-dimensional image data and the results of the comparison with regard to the two-dimensional image data. More specifically, the inspection unit 78 determines whether the respective calculated differences are larger than predetermined reference values. When at least one of the respective differences is larger than the predetermined reference value, the inspection unit 78 determines the "presence of a foreign matter". When the respective differences are smaller than the predetermined reference values, on the other hand, the inspection unit 78 determines the "absence of any foreign matter".

Furthermore, when all the "three-dimensional good/poor quality judgment process", the "two-dimensional good/poor quality judgment process", and the "foreign matter presence/absence determination process" give the "good" results, the inspection unit 78 determines that the inspection object, i.e., the target inspection area, of the printed circuit board 1 is "non-defective" and stores this result of the determination into the storage unit 57.

When any of the "three-dimensional good/poor quality judgment process", the "two-dimensional good/poor quality judgment process", and the "foreign matter presence/absence determination process" gives the "poor" result, on the other hand, the inspection unit 78 determines that the inspection object, i.e., the target inspection area is "defective" and stores this result of the determination into the storage unit 57.

When all the target inspection areas are determined to be "non-defective" as the results of the inspection process with regard to all the target inspection areas of the printed circuit board 1, the post-solder printing inspection device 13 determines that the printed circuit board 1 has no abnormality (pass result) and stores this result of the determination into the storage unit 57.

When there is even one target inspection area determined to be "defective", on the other hand, the post-solder printing inspection device 13 determines that the printed circuit board 1 has a failed location (rejection result) and stores this result of the determination into the storage unit 57 and notifies the outside of this result of the determination via the display unit 56, the communication unit 58 or the like.

As described above in detail, the configuration of one or more embodiments compares the two-dimensional image data and the three-dimensional image data that are the original image data with the reconfigured two-dimensional image data and the reconfigured three-dimensional image data that are reconfigured by inputting the original image data into the AI model 100, and determines the presence or the absence of any foreign matter on the printed circuit board 1, based on the results of the comparison. Accordingly, the two types of image data to be compared with each other are related to the same printed circuit board 1.

The configuration of one or more embodiments does not need to provide a master substrate for the purpose of comparison, unlike the technique of detecting a foreign matter by comparison with a reference image with regard to a master substrate. This configuration is accordingly free from the limitation of the printed circuit board 1 as the inspection object due to the reason that the printed circuit board 1 as the inspection object and the master substrate need to have a required degree of sameness. This configuration thus ensures the simpler inspection for any foreign matter.

The two types of image data to be compared with each other have substantially identical shapes and appearances of the printed circuit board 1 (for example, the shapes and the positions of the solder paste 5). The configuration of one or more embodiments accordingly does not need to set relatively mild conditions with a view to preventing a false detection but enables the stricter inspection conditions to be set, unlike the technique of detecting a foreign matter by comparison with the reference image. Furthermore, in the configuration of one or more embodiments, the heights of the solder paste 5 and changes in the heights of the solder paste 5 do not affect the detection of a foreign matter. This configuration accordingly allows for detection of a foreign matter having a side face that changes more gently than a change in a side face of the solder paste 5 and also allows for detection of a foreign matter that is lower than the solder paste 5. Moreover, the two types of image data to be compared with each other may be obtained under the same imaging conditions of the printed circuit board 1 as the inspection object (for example, the placement position, the placement angle, and the deflection of the printed circuit board 1) and the same imaging conditions of the inspection device (for example, the conditions of illumination and the angle of view of the camera 32D). The combination of these functions and advantageous effects described above enables a foreign matter to be detected with a very high accuracy.

Additionally, the configuration of one or more embodiments uses the AI model 100 to perform an inspection for any foreign matter. There is accordingly no need to store in advance printing setting information with regard to a large number of the lands 3 present on the printed circuit board 1 and individual portions of the solder paste 5 printed on the respective lands 3, for the purpose of an inspection for any foreign matter. There is also no need to refer to such printing setting information in the process of the inspection. Accordingly, this configuration enhances the efficiency of the inspection.

Moreover, the configuration of one or more embodiments uses both the three-dimensional image data and the two-dimensional image data to determine the presence or the absence of any foreign matter on the printed circuit board 1. This configuration enables a foreign matter to be detected with the higher accuracy.

The present disclosure is not limited to the description of the above embodiments but may be implemented, for example, by configurations described below. The present disclosure may also be naturally implemented by applications and modifications other than those illustrated below.

(a) The configuration of the embodiments described above uses the image data with regard to the non-defective printed circuit board 1 without any foreign matter that has passed the post-reflow inspection, as the learning data in the process of learning of the neural network 90. A modified configuration may, however, use image data with regard to a non-defective printed circuit board 1 without any foreign matter that has been visually selected by the operator, for example, after printing of the solder paste 5, as the learning data.

According to another modification, the learning unit 77 may be configured to generate virtual non-defective image data and perform learning of the neural network 90 by using this virtual non-defective image data.

Figure 10:
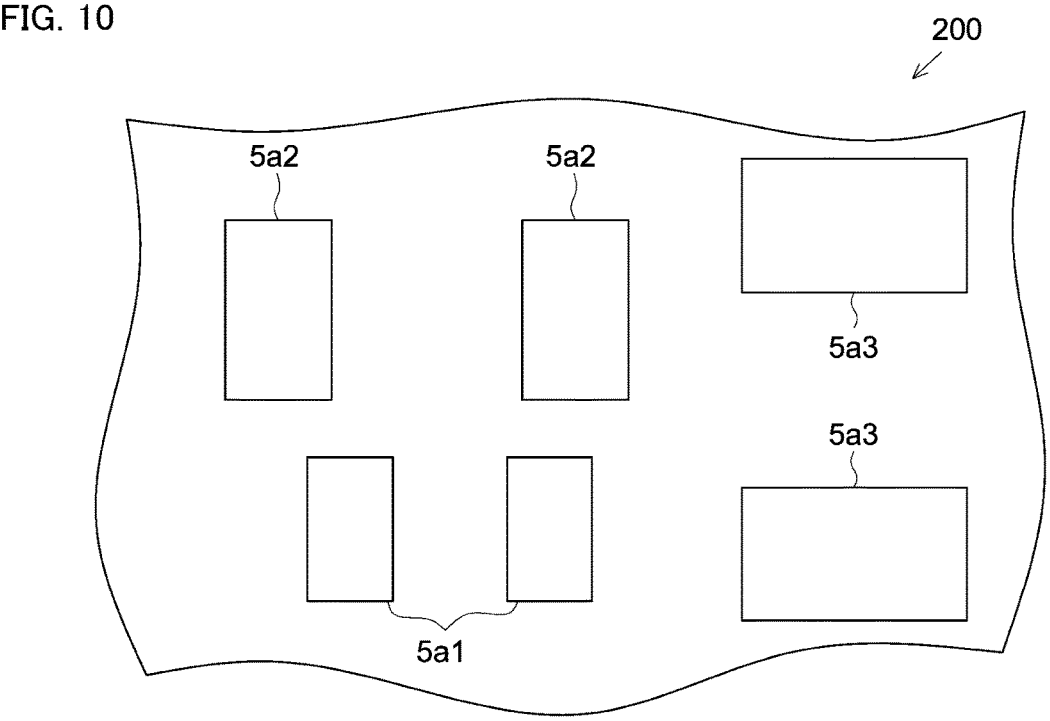
FIG. 10 is a diagram illustrating one example of base image data.

More in detail, as shown in FIG. 10, the modified configuration obtains in advance a plurality of image data with regard to target inspection areas in a printed circuit board 1 without any foreign matter, as base image data 200. The base image data 200 may be obtained by, for example, the post-solder printing inspection device 13 that takes an image of the printed circuit board 1 under the same conditions as those for the inspection. The base image data 200 may be with regard to an image obtained by imaging the printed circuit board 1 without the solder paste 5 printed thereon or may be with regard to an image obtained by eliminating portions of the solder paste 5 from a taken image of the printed circuit board 1 with the solder paste 5 printed thereon and performing a complementary process to make the eliminated portions the lands 3.

The base image data 200 includes base solder areas images 5a1, 5a2 and 5a3 that are images of areas with regard to the solder paste 5. In the illustrated example, the base solder area images 5a1, 5a2 and 5a3 respectively correspond to the lands 3 where the solder paste 5 is to be printed.

Figure 11:
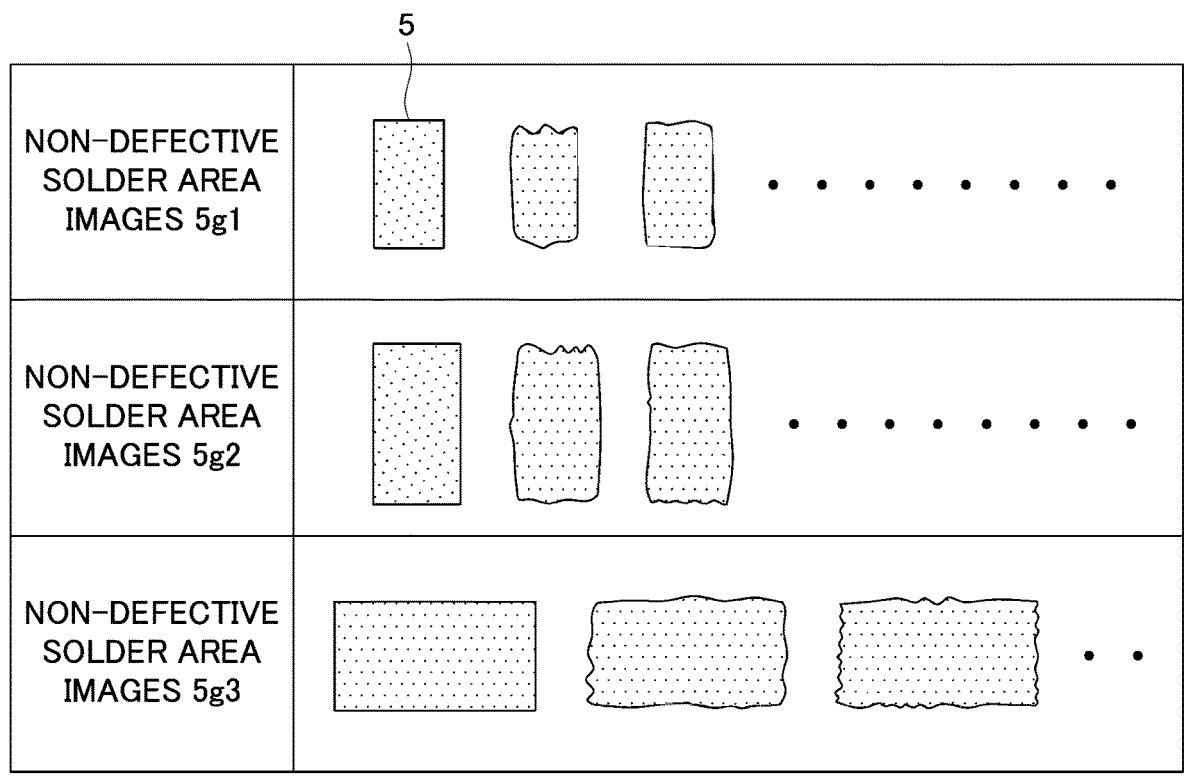
FIG. 11 is a diagram illustrating one example of non-defective solder area images.

As shown in FIG. 11, this modified configuration also obtains in advance multiple different types of respective non-defective solder area images 5g1, 5g2 and 5g3 that are images of areas with regard to the solder paste 5 without any foreign matter and that correspond to the base solder area images 5a1, 5a2 and 5a3. The non-defective solder area images 5g1, 5g2 and 5g3 are images of the solder paste 5 and respectively correspond to the base solder area images 5a1, 5a2 and 5a3 of the different sizes. In the illustrated example, the non-defective solder area images 5g1 correspond to the base solder area images 5a1; the non-defective solder area images 5g2 correspond to the base solder area images 5a2; and the non-defective solder area images 5g3 correspond to the base solder area images 5a3. The non-defective solder area images 5g1, 5g2 and 5g3 may be obtained by, for example, from image data with regard to a non-defective printed circuit board 1 without any foreign matter that has passed the inspection.

Figures 12, 13:
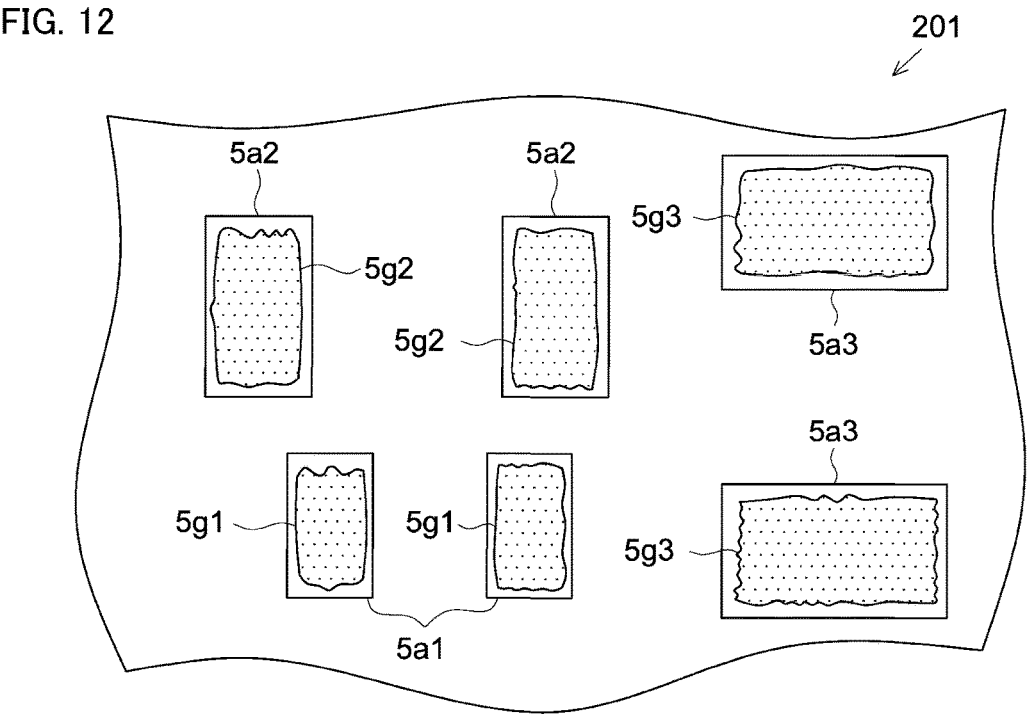
FIG. 12 is a diagram illustrating one example of virtual non-defective image data.
FIG. 13 is a diagram illustrating another example of the non-defective solder area images.

For example, in the pre-processing of step S101 described above, the learning unit 77 uses the base image data 200 and the non-defective solder area images 5g1, 5g2 and 5g3 to generate virtual non-defective image data as shown in FIG. 12. More specifically, the learning unit 77 generates the virtual non-defective image data 201 by replacing at least part of the base solder area images 5a1, 5a2 and 5a3 included in the base image data 200 (in the illustrated example, certain ranges of the base solder area images 5a1, 5a2 and 5a3 having the same shapes as those of the non-defective solder area images 5g1, 5g2 and 5g3) with the non-defective solder area images 5g1, 5g2 and 5g3.

The learning unit 77 repeats the above processing with changing the base image data 200 used as the standard and the non-defective solder area images 5g1, 5g2 and 5g3 used for the replacement, so as to generate a required number of different types of virtual non-defective image data 201. The learning unit 77 then performs learning of the neural network 90 by using this generated virtual non-defective image data 201 as learning data. In this example, the learning unit 77 configures the "learning data generation unit", and the process of generating the virtual non-defective image data 201 corresponds to the "learning data generation process".

Employing the above configuration relating to the learning enables a large number of different learning data (virtual non-defective image data 201) to be generated from one base image data 200 with regard to one printed circuit board 1. The required number of the printed circuit boards 1 to be provided for learning is only the number that provides a required number of the base image data 200. This reduces the number of the printed circuit board 1 to be provided for learning and, as a result, effectively reduces the cost.

As shown in FIG. 13, images including both the lands 3 and the portions of the solder paste 5 printed on the lands 3 may be used as non-defective solder area images 5h1, 5h2 and 5h3. In this case, virtual non-defective image data may be generated by replacing the entirety of the base solder area images 5a1, 5a2 and 5a3 with the non-defective solder area images 5h1, 5h2 and 5h3.

Moreover, data corresponding to the two-dimensional image data and data corresponding to the three-dimensional image data may be generated as the virtual non-defective image data. In a configuration described below in (b), only one of the data corresponding to the two-dimensional image data and the data corresponding to the three-dimensional image data may be generated.

(b) The configuration of the embodiments described above uses the two-dimensional image data and the three-dimensional image data to perform an inspection for the presence or absence of any foreign matter. A modified configuration may perform an inspection for the presence or absence of any foreign matter by using only one of the above two types of image data.

(c) The configuration of the embodiments described above provides the model (two-dimensional AI model) corresponding to the two-dimensional image data and the model (three-dimensional AI model) corresponding to the three-dimensional image data, as the AI model 100. A modified configuration may, however, provide a common AI model corresponding to the two-dimensional image data and the three-dimensional image data.

(d) The measurement methods of the solder paste 5 including the three-dimensional measurement method and the two-dimensional measurement method are not limited to those described in the above embodiments, but other configurations may be employed. For example, the above embodiments are configured to obtain four different image data under each patterned light of different phases by shifting the phase by every 90 degrees in the process of three-dimensional measurement by the phase shift method. The number of times of the phase shift and the amount of the phase shift are, however, not limited to those of the embodiments. The above embodiments employ the phase shift method as the three-dimensional measurement method. This is, however, not essential, but another three-dimensional measurement method, for example, a light section method, a moire method, a focusing method or a spatial coding method, may be employed.

(e) The above embodiments are configured to perform the "three-dimensional good/poor judgment process" and the "two-dimensional good/poor judgment process" in the inspection process. A modification may be configured not to perform one or both of these processes.

(f) The configuration of the AI model 100 (the neural network 90) and the learning method thereof are not limited to those of the above embodiments. For example, a modified configuration may perform a process, such as a normalization process, of various data as needed basis, for example, in the learning process of the neural network 90 or in the reconfigured image data obtaining process. The structure of the neural network 90 is not limited to the structure shown in FIG. 5. For example, the neural network 90 may be configured to have a polling layer after the convolution layers 93. The neural network 90 may also be configured to have a different number of layers, a different number of nodes in each layer, and a different connection structure of the respective nodes.

Furthermore, according to the embodiments described above, the AI model 100 (the neural network 90) is configured as the generation model having the structure of the convolutional autoencoder (CAE). This is, however, not essential. The AI model 100 may be configured as a generation model having the structure of another type of autoencoder, for example, a variational autoencoder (VAE).

The configuration of the embodiments described above performs learning of the neural network 90 by the back-propagation algorithm. This is, however, not essential. A modified configuration may perform learning by using any of other various learning algorithms.

Moreover, the neural network 90 may be configured by an exclusive AI processing circuit, such as an AI chip. In this case, a modified configuration may store only learning information including the parameters in the storage unit 57 and may cause the exclusive AI processing circuit to read out the learning information and set the learning information in the neural network 90, so as to configure the AI model 100.

According to the embodiments described above, the control device 33 is provided with the learning unit 77 and is configured to perform learning of the neural network 90 inside of the control device 33. This configuration is, however, not essential. For example, a modification may omit the learning unit 77 and may be configured to perform learning of the neural network 90 outside of the control device 33 and store the AI model 100 learnt outside (the learnt neural network 90) into the storage unit 57. In the configuration of performing the learning by using the virtual non-defective image data 201 as described above in (a), the virtual non-defective image data 201 may be generated outside of the control device 33.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . printed circuit board, 5 . . . solder paste, 5a1, 5a2, 5a3 . . . base solder area images, 5g1, 5g2, 5g3, 5h1, 5h2, 5h3 . . . non-defective solder area images, 13 . . . post-solder printing inspection device (substrate foreign matter inspection device), 32A . . . first illumination device (irradiation unit for three-dimensional measurement), 32B . . . second illumination device (irradiation unit for three-dimensional measurement), 32C . . . third illumination device (irradiation unit for two-dimensional measurement), 32D . . . camera (image data obtaining device), 33 . . . control device, 77 . . . learning unit (learning data generation unit), 78 . . . inspection unit (reconfigured image data obtaining unit, comparison unit), 90 . . . neural network, 91 . . . encoder unit (encoding portion), 92 . . . decoder unit (decoding portion), 100 . . . AI model, 200 . . . base image data, 201 . . . virtual non-defective image data

What is claimed is:

1. A substrate foreign matter inspection device that inspects whether any foreign matter is present or absent on a printed circuit board on which solder paste is printed, the device comprising:
   an image data obtaining device that obtains image data of a target inspection area in the printed circuit board including a printed portion of the solder paste;
   a storage that stores a neural network and a model, wherein
      the model is generated by learning of the neural network that includes an encoding portion and a decoding portion by using, as learning data, only image data of the target inspection area that do not include any foreign matter, the encoding portion extracting a characteristic amount from input image data and the decoding portion reconfiguring the input image data from the characteristic amount; and
   a control device that:
      obtains reconfigured image data by inputting original image data obtained by the image data obtaining device into the model,
      compares the original image data with the reconfigured image data, and
      determines whether any foreign matter is present or absent on the printed circuit board based on a result of comparison with the reconfigured image data, wherein
   the control device obtains in advance different types of non-defective solder area images, obtains different types of virtual non-defective image data by replacing at least part of base solder area images of base image data with the different types of non-defective solder area images, and uses the different types of virtual non-defective image data as the learning data,
   the base image data are image data of the target inspection area that does not include any foreign matter,
   the base solder area images are images of areas of solder paste included in the base image data, and
   the non-defective solder area images are images of areas of solder paste that do not include any foreign matter and correspond to the base solder area image.

2. The substrate foreign matter inspection device according to claim 1, further comprising:
   an illumination device for three-dimensional measurement that irradiates the target inspection area with light for three-dimensional measurement; and
   an illumination device for two-dimensional measurement that irradiates the target inspection area with light for two-dimensional measurement, wherein
   the image data obtaining device obtains, as three-dimensional image data, image data of the target inspection area irradiated with the light for three-dimensional measurement, and obtains, as two-dimensional image data, image data of the target inspection area irradiated with the light for two-dimensional measurement, and
   the control device:
      compares the three-dimensional image data with reconfigured three-dimensional image data that is reconfigured using the model based on the three-dimensional image data,
      compares the two-dimensional image data with reconfigured two-dimensional image data that is reconfigured using the model based on the two-dimensional image data,
      determines whether any foreign matter is present or absent on the printed circuit board based on results of comparison with the reconfigured three-dimensional image data and comparison with the reconfigured two-dimensional image data.

3. A substrate foreign matter inspection method of inspecting whether any foreign matter is present or absent on a printed circuit board on which solder paste is printed, the method comprising:
- an image data obtaining process of obtaining image data of a target inspection area in the printed circuit board including a printed portion of the solder paste;
- a storing process of storing, in a storage, a neural network and a model, wherein
  - the model is generated by learning of the neural network that includes an encoding portion and a decoding portion by using, as learning data, only image data of the target inspection area that do not include any foreign matter, the encoding portion extracting a characteristic amount from input image data and the decoding portion reconfiguring the input image data from the characteristic amount;
- a reconfigured image data obtaining process of obtaining reconfigured image data by inputting original image data obtained in the image data obtaining process into the model;
- a comparison process of comparing the original image data with the reconfigured image data; and
- a determining process of determining whether any foreign matter is present or absent on the printed circuit board based on a result of the comparison process, wherein the method further comprising:
- obtaining in advance different types of non-defective solder area images, obtaining different types of virtual non-defective image data by replacing at least part of base solder area images of base image data with the different types of non-defective solder area images, and using the different types of virtual non-defective image data as the learning data, the base image data are image data of the target inspection area that does not include any foreign matter, the base solder area images are images of areas of solder paste included in the base image data, and the non-defective solder area images are images of areas of solder paste that do not include any foreign matter and correspond to the base solder area image.

4. The substrate foreign matter inspection method according to claim 3, further comprising:
- a three-dimensional irradiation process of irradiating the target inspection area with light for three-dimensional measurement; and
- a two-dimensional irradiation process of irradiating the target inspection area with light for two-dimensional measurement, wherein the image data obtaining process includes obtaining, as three-dimensional image data, image data of the target inspection area irradiated with the light for three-dimensional measurement, and obtaining, as two-dimensional image data, image data of the target inspection area irradiated with the light for two-dimensional measurement, the comparison process includes comparing the three-dimensional image data with reconfigured three-dimensional image data that is reconfigured using the model based on the three-dimensional image data, and comparing the two-dimensional image data with reconfigured two-dimensional image data that is reconfigured using the model based on the two-dimensional image data, and the determining process includes determining whether any foreign matter is present or absent on the printed circuit board based on results of the comparison with the reconfigured three-dimensional image data and comparison with the reconfigured two-dimensional image data.

* * * * *